(No Model.)

L. WESSEL.
GRASS CURLING AND BALING PRESS.

No. 596,255. Patented Dec. 28, 1897.

Witnesses
W. C. Corlies
C. H. Crawford

Inventor
Louise Wessel
By Rudolph W. Lotz
Atty (No Model.) 5 Sheets—Sheet 3.

L. WESSEL.
GRASS CURLING AND BALING PRESS.

No. 596,255. Patented Dec. 28, 1897.

Witnesses
W. C. Coolies
C. H. Crawford

Inventor
Louise Wessel
By Rudolph M. Lotz
Atty

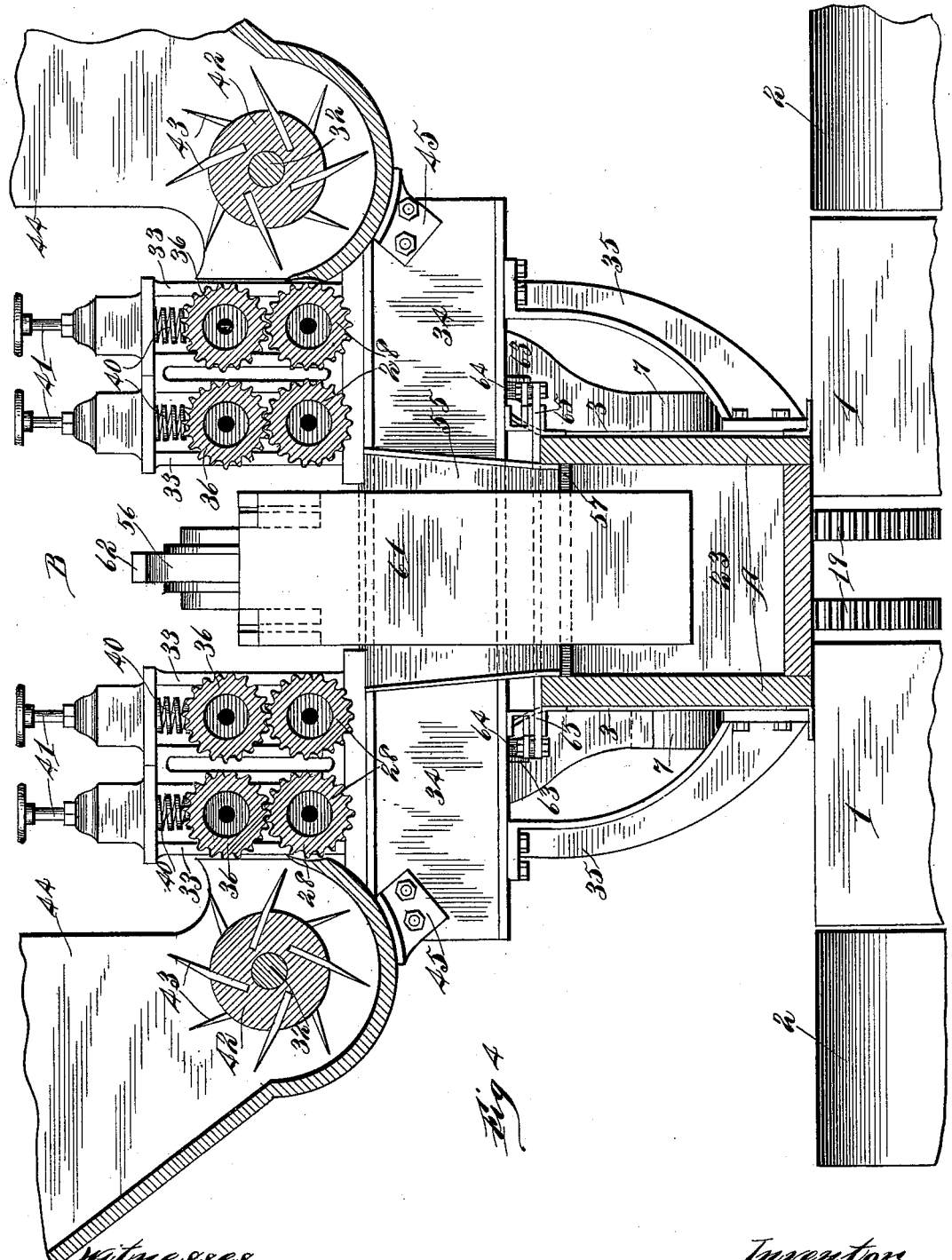

(No Model.)  5 Sheets—Sheet 5.
L. WESSEL.
GRASS CURLING AND BALING PRESS.
No. 596,255.  Patented Dec. 28, 1897.
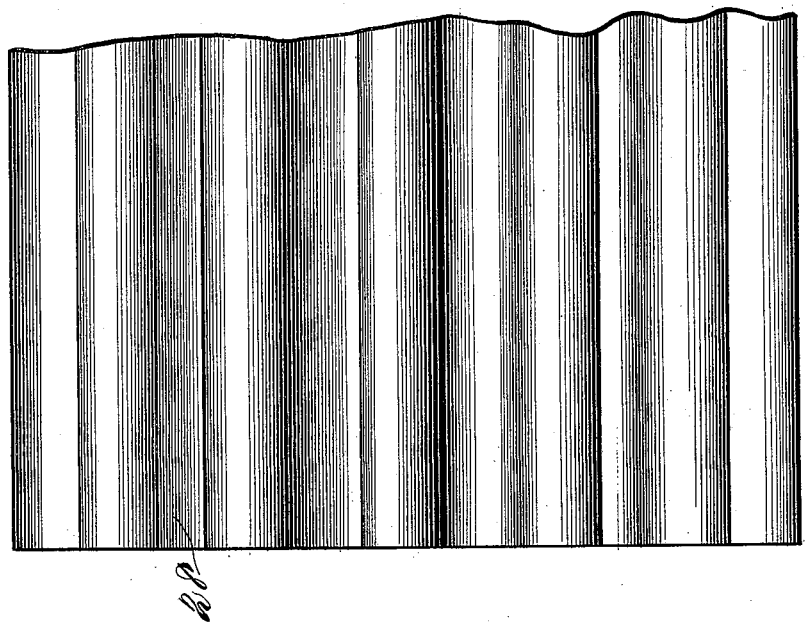
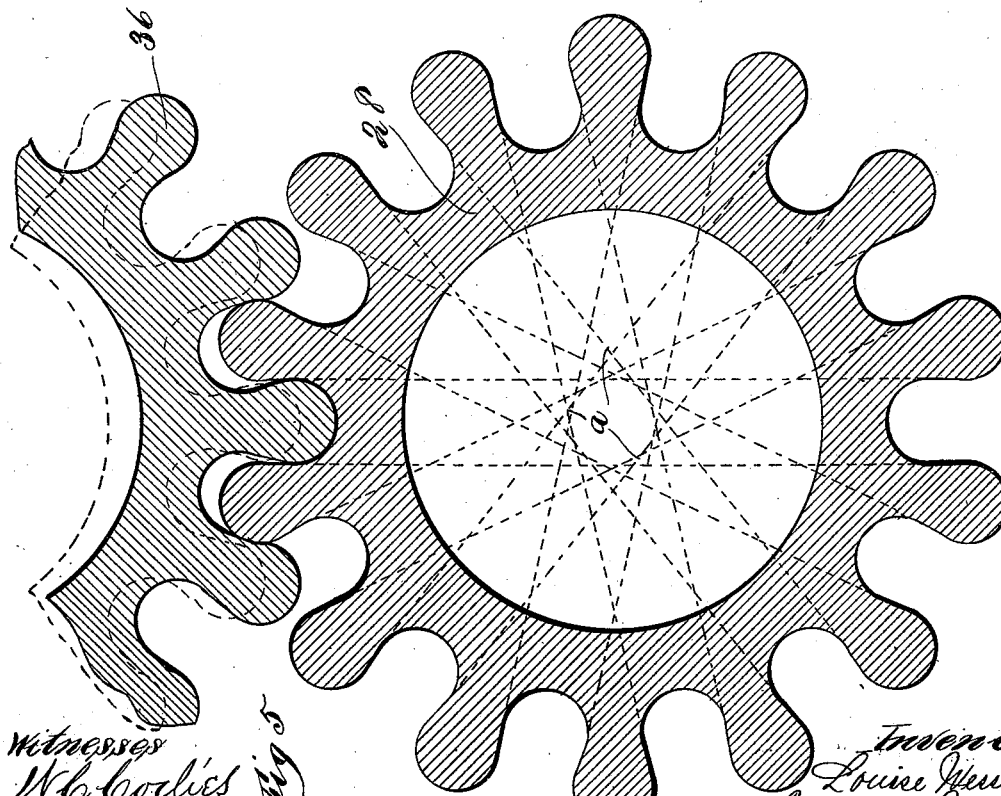

United States Patent Office.

LOUISE WESSEL, OF NORTH JUDSON, INDIANA.

GRASS CURLING AND BALING PRESS.

SPECIFICATION forming part of Letters Patent No. 596,255, dated December 28, 1897.

Application filed May 27, 1897. Serial No. 638,354. (No model.)

*To all whom it may concern:*

Be it known that I, LOUISE WESSEL, a citizen of the United States, residing at North Judson, in the county of Stark and State of Indiana, have invented certain new and useful Improvements in Grass-Curling Machines; and I do hereby declare the following to be a full, clear, and exact description of the invention, such as will enable others skilled in the art to which it appertains to make and use the same.

My invention relates to a novel construction in a grass curling or crimping and baling machine, the object being to provide a machine of this construction which is portable and can be transported to the field where the hay or grass is stacked and which is simple, durable, and efficient in operation; and it consists in the features of construction and combinations of parts hereinafter fully described and claimed.

Figure 1:
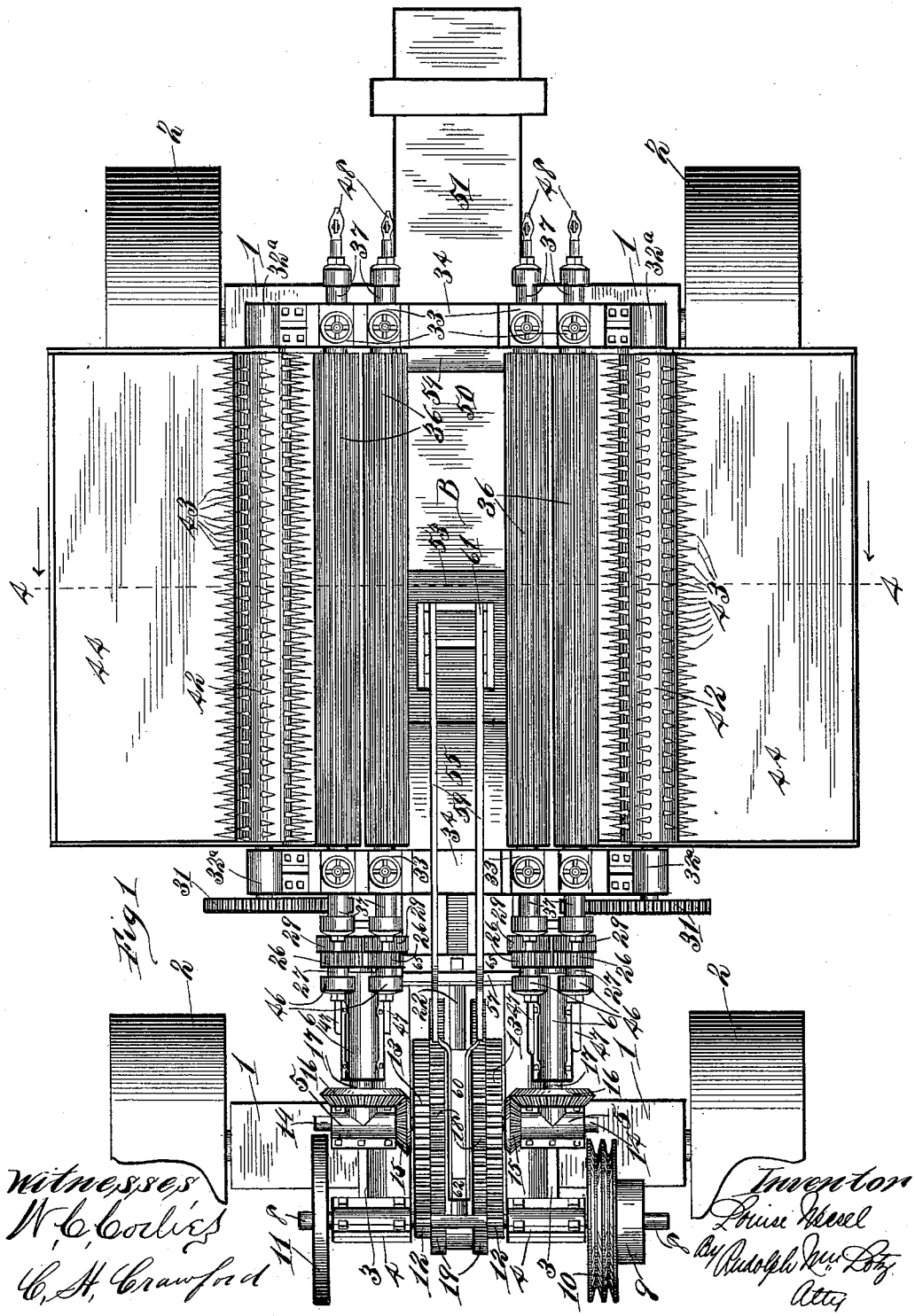
Figure 2:
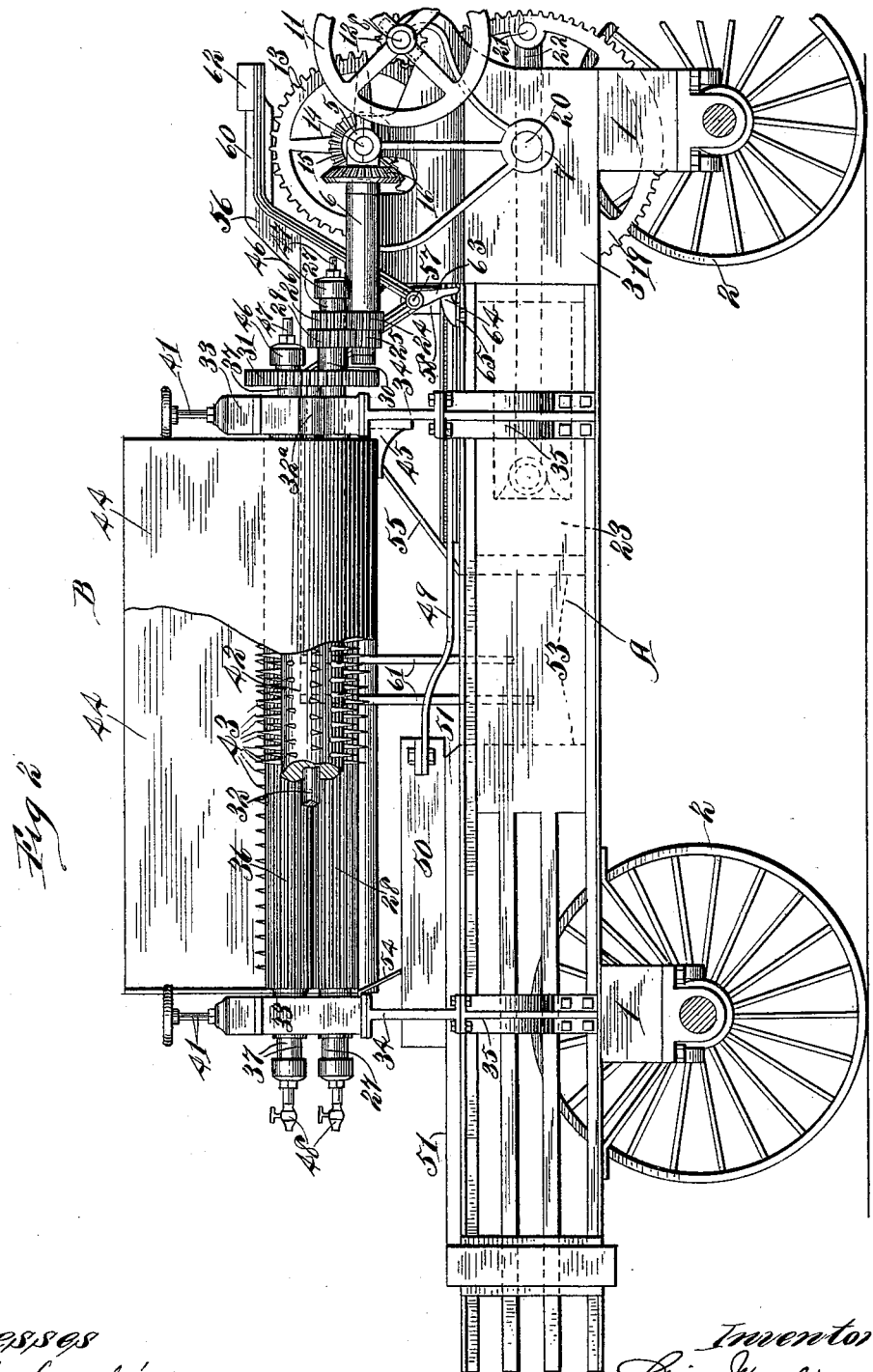
Figure 3:
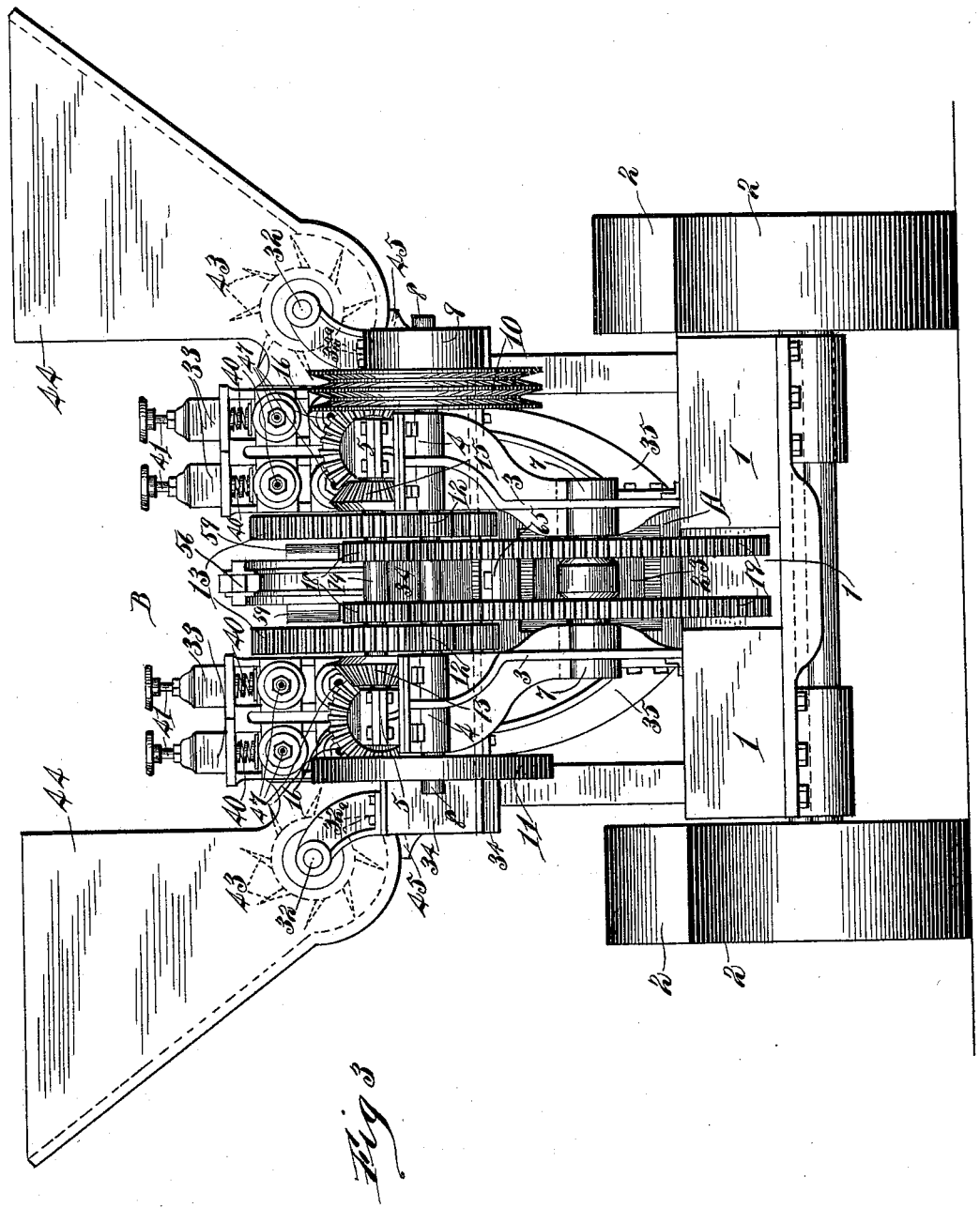

In the accompanying drawings, illustrating my invention, Figure 1 is a top plan view of a grass curling and baling machine constructed in accordance with my invention. Fig. 2 is a side elevation of the same. Fig. 3 is an end elevation of the same. Fig. 4 is a vertical transverse section on the line 4 4 of Fig. 1. Fig. 5 is a transverse section of the curling or crimping rollers I employ. Fig. 6 is a side elevation of the same.

Referring now to said drawings, A indicates a baling-press frame of any suitable construction, which is mounted upon the beams 1, mounted upon the shafts of the wheels 2, and forms a suitable support for the grass-curling machine B, which is mounted thereon, as hereinafter described. At the forward end of said baling-press frame A are two plates 3, in which bearings 4, 5, 6, and 7, respectively, are formed. A shaft 8, carrying a pulley 9 and rope-sheave 10 at one end and a fly-wheel 11 at its other end, is mounted in said bearings 4 and carries spur-pinions 12 between said bearings 4, which intermesh with spur-gears 13, mounted upon the shaft 14, running in the bearings 5. Said shaft 14 also carries two bevel-pinions 15, which intermesh with bevel-gears 16, carried by shafts 17, running in said bearings 6. Said shaft 14 also carries spur-pinions 18, which intermesh with spur-gears 19, carried by the shafts 20, running in the bearings 7. Said spur-gears 19 are connected by a crank-pin 21, on which one end of the connecting-rod 22 is pivoted, which at its other end is pivoted to the plunger 23 of said baling-press. Said shafts 17 carry differential spur-pinions 24 and 25 at their other ends, which intermesh, respectively, with spur-pinions 26, carried by the shafts 27 of the curling-rollers 28, and with spur-pinions 29, carried by the hollow shafts 30, mounted upon said shafts 27. Said hollow shafts 30 carry spur-pinions at their other ends, which intermesh with the spur-gears 31, carried by shafts 32, running in bearings 32ª in the frames 33. Said shafts 27 run in bearings in said frames 33, which are mounted upon the I-beams 34, supported upon brackets 35, secured at their lower ends to the sides of said baling-press frame A. The bearings in which said shafts 27 run are rigidly mounted in said frames 33, and, as before stated, said shafts 27 carry the hollow curling-rollers 28, which intermesh with the upper curling-rollers 36, carried by hollow shafts 37, running in sliding bearings 38, mounted in guides 39 in said frames 33 above said bearings for said shafts 27. Springs 40, whose tension is regulated by means of hand-wheel shafts 41, bear upon said bearings 38, and thus serve to hold said rollers 36 hard down upon said rollers 28, thus subjecting the grass passing between the same to pressure, as desired, and permitting said rollers 36 sufficient play-room to accommodate varying quantities of grass. Said shafts 32 carry cylinders 42, provided on their surfaces with a plurality of rows of teeth 43, set preferably at an incline, which are adapted to feed the grass thrown into the hoppers 44 to said rollers 28 and 36 and to act as combs to cause said grass to pass transversely through said rollers, so as to be crimped and corrugated throughout its entire length. Said hopper 44 is mounted upon brackets 45, secured to the I-beams 34, which support said frames 33. Said rollers 28 and 36 are hollow, as are also the shafts 27 and 37, which are provided at their forward ends with stuffing-boxes 46, in which the ends of pipes 47 are held to permit the rotation of said rollers with relation to said pipes. Said shafts 27 are thus connected with rigid pipes connected with a source of supply of steam, while said shafts 37 are connected with flexible pipes for obvious reasons, also connected with a source of supply of steam. At their rear ends said shafts 27 and 37 are connected with blow-off cocks 48, by means of which the circulation of the steam is effected and through which condensed steam is expelled. Said rollers 28 and 36 are geared to revolve at a greater speed than said rollers 42, so that as soon as the end of a culm of grass is caught between them it is pulled through between the teeth 43, and thus combed out straight, so that it will be subjected to the action of said rollers gradually throughout its entire length. After said culms have passed through both pairs of said rollers 28 and 36 they fall into the baling-press or upon devices by which they are fed into the baling-press, as hereinafter described.

Connected with the plunger of the baling-press by means of the rods 49 is a sliding feeder 50, which slides upon a table 51 and passes through an opening 52 in the rearmost I-beam 34. The said table 51 ends at the rear end of the feed-opening 53 of said press, and the movement of said feeder 50 extends between said end of said table 51 and a scraper 54, mounted adjacent said rearmost I-beam 34. Said feeder 50 moves in accordance with said plunger 23, and on the compression stroke of same it will be obvious that any grass falling upon said feeder 50 will be detained by said scraper 54 and at the end of the compression stroke of said plunger will fall upon the table 51. The return stroke of said plunger 23 and feeder 50 will obviously cause the latter to feed the grass falling upon said table 51 into said feed-opening 53 of said press. Extending upwardly at an incline from the forward end of said opening 53 is a guide-plate 55, which will guide grass falling thereon into said opening 53. Owing to the loose character of the corrugated grass it is necessary to force the same down into the opening 53, and for the purpose I have provided a feeder 56, pivoted upon a shaft 57, mounted in bearings 58 on each side of said press-frame A. Said feeder 56 consists of a V-shaped frame provided with arms or extensions 59 and 60, said arm 59 carrying a plunger 61 and said arm 60 carrying a counterweight 62, which is adapted to hold said arm 59 and plunger 61 normally at the upper limit of their movement. Said frame is provided at its apex or point at which it is pivoted with a downwardly-extending arm 63, which is adapted to be engaged by a lug 64 on the bar 65, which is secured to said plunger 23 and to which the ends of the rods 49 are secured. As said plunger approaches the end of its return stroke said lug 64 engages said arm 63, thus causing said plunger 61 to enter the feed-opening 53 and raising said counterweight 62. As said plunger begins its compression stroke said arm 63 is released and the counterweight 62 raises the plunger 61 out of the path of said plunger 23, the downward movement of the arm 60, carrying said counterweight 62, being limited by the shaft 14.

In Figs. 5 and 6 I have shown the construction of the rollers 28 and 36 in detail. In said rollers the teeth and grooves between the same are of about semicylindrical form, the teeth slightly exceeding a semicylinder and being narrower at their bases than at their outer end portions. Said grooves are of exactly semicylindric form at their inner ends, their side walls being also parallel and tangential with said inner cylindrical surface and the cylindrical ends of said teeth. The said side walls of said grooves or side edges of said teeth are so formed that the planes thereof if extended through said rollers would be tangential with a cylinder having the same radius as said grooves at the side thereof corresponding with the side of the groove coinciding with said plane and on the opposite side of said roller would coincide with the plane of the side wall of a groove situated diametrically opposite said first-named groove. The said planes are indicated by the dotted lines $a$. The radius of the cylindrical ends of said teeth is slightly less than the radius of said grooves, so as to permit a small quantity of grass to pass between the teeth and the grooves in which they are adapted to fit.

By means of the above-described conformation of the rollers the grass passing between the same will not only be subjected to pressure in the presence of heat, but will also be subject to a strong rubbing action, by means of which the coarse culms of grass are rubbed into fibers and made as pliable and soft as the fine culms. This enables me to employ the ordinary prairie or marsh grass, which is very tough and coarse, for the manufacture of curled grass for mattresses and packing glassware, chinaware, furniture, and the like.

I claim as my invention—

1. In a machine of the kind specified, the combination with a baling-press and means for driving the same, of a grass-curling machine mounted thereon and geared thereto and adapted to deliver the curled grass to said baling-press.

2. In a machine of the kind specified, a baling-press, grass-curling rollers mounted in bearings in a frame mounted upon said baling-press and adapted to deliver the curled grass thereto, feed-rollers mounted in bearings in said frame on each side of the sets of said curling-rollers, a hopper around said feed-rollers, gearing between said curling-rollers and a drive-shaft, gearing between said drive-shaft and said baling-press, and gearing between said feed-rollers and said drive-shaft, substantially as described.

3. In a machine of the kind specified, a baling-press, grass-curling rollers mounted in bearings in a frame mounted upon said baling-press and adapted to deliver the curled grass thereto, feed-rollers mounted in bearings in said frame on each side of the sets of said curling-rollers, a hopper around said feed-rollers, gearing between said curling-rollers and a drive-shaft, gearing between said drive-shaft and said baling-press, and gearing between said feed-rollers and said drive-shaft, to cause said feed-rollers to move more slowly at their peripheries than said curling-rollers, whereby the latter will withdraw the grass from between the teeth of said feed-rollers to cause the same to pass transversely between said curling-rollers, substantially as described.

4. In a machine of the kind specified, the combination with devices for curling grass, of a baling-press geared thereto and adapted to receive the curled grass, a plunger in said baling-press, a reciprocating feeder connected therewith and sliding on a guide-table on said press, a rigid scraper adapted to remove the grass from said feeder and cause it to fall upon said guide-table, whereby said feeder will be caused to transport said grass from said table to the feed-opening of said baling-press, substantially as described.

5. In a machine of the kind specified, the combination with devices for curling grass, of a baling-press geared thereto and adapted to receive the curled grass therefrom, a plunger in said baling-press, a horizontally-reciprocating feeder connected with said plunger, a guide-table on said press upon which said feeder moves, and a vibrating feeder journaled upon said press and provided with a trip-lever, and devices connected with the plunger and adapted to engage said trip-finger when said plunger is at the rearward limit of its movement to cause said feeder to force the grass down into the baling-press at the feed-opening thereof, substantially as described.

6. In a machine of the kind specified, the combination with devices for curling grass, of a baling-press geared thereto and adapted to receive the curled grass therefrom, a plunger in said baling-press, a horizontally-reciprocating feeder connected with said plunger, a guide-table on said press upon which said feeder moves, and a vibrating feeder journaled upon said press and provided with a trip-lever, a plunger at one end of said vibrating feeder adapted to enter the feed-opening of said press, a counterweight at the other end of said feeder adapted to hold said plunger normally at the upper limit of its movement, and devices connected with the plunger of said press and adapted to engage said trip-finger as said plunger approaches the rearward limit of its movement to cause the plunger of said feeder to force the grass down into the press through the feed-opening thereof, substantially as described.

In testimony whereof I affix my signature in presence of two witnesses.

LOUISE WESSEL.

Witnesses:
RUDOLPH WM. LOTZ,
ERWIN J. LOTZ.